United States Patent [19]

Liang

[11] Patent Number: 5,379,930
[45] Date of Patent: Jan. 10, 1995

[54] TORCH SPECIALLY ADAPTED TO GASOLINE-OXYGEN CUTTING MACHINE AND CUTTING MACHINE PROVIDED WITH SAID TORCH

[76] Inventor: Guangqi Liang, 403-2-7, Xiwangzhuang, Wudaokou, Haidian Histrict, Beijing 100083, China

[21] Appl. No.: 81,179

[22] Filed: Jun. 25, 1993

[30] Foreign Application Priority Data

Jun. 27, 1992 [CN] China ................... 92225731

[51] Int. Cl.$^6$ .............................................. B23K 7/00
[52] U.S. Cl. .......................................... 266/74; 266/48
[58] Field of Search ................... 266/48, 74; 148/194

[56] References Cited

U.S. PATENT DOCUMENTS 3,299,939  1/1967  Marra, Sr. ........................ 266/48
5,120,026  6/1992  Bissonnette ...................... 266/48

OTHER PUBLICATIONS

Unofficial English–language Abstract of Chinese Utility Model No. 90218437 Dec. 1991.

*Primary Examiner*—Scott Kastler
*Attorney, Agent, or Firm*—Wigman, Cohen, Leitner & Myers

[57] ABSTRACT

A curing torch specially adapted to gasoline-oxygen cutting machine and cutting machine provided with said torch. Said torch comprises a cutting torch body; a gasoline tube, a preheating oxygen tube and a cutting oxygen tube; a gasoline adjusting valve, a preheating oxygen adjusting valve and a cutting oxygen adjusting valve fitted to the cutting torch body; and a cutting head, said gasoline tube, said preheating oxygen tube and said cutting oxygen tube being communicated with a main oxygen tube and a main gasoline tube through the gasoline adjusting valve, the preheating oxygen adjusting valve and the cutting oxygen adjusting valve respectively, and further communicated with an oxygen bottle and an gasoline tank through the main oxygen tube and the main gasoline tube respectively, the other ends of said gasoline tube, said preheating oxygen tube and said cutting oxygen tube being communicated with the cutting head, wherein said cutting head comprises a cutting oxygen passage, at least one preheating oxygen passage, at least one gasoline passage and a combustion cover, said cutting oxygen passage being located at the center of the cutting head, said gasoline passage(s) being located at the outside of said cutting oxygen passage, and said preheating oxygen passage being located at the outmost side, said combustion cover being screwed on one end of the cutting head, and the other end of the curing head being connected with the curing torch body.

15 Claims, 3 Drawing Sheets

5,379,930

TORCH SPECIALLY ADAPTED TO GASOLINE-OXYGEN CUTTING MACHINE AND CUTTING MACHINE PROVIDED WITH SAID TORCH

FIELD OF THE INVENTION

The present invention relates to a torch specially adapted to gasoline-oxygen cutting and a cutting machine and a cutting machine provided with said torch.

STATE OF THE ART

With the development of cutting processes, the combination of oxygen and combustion gas such as natural gas, liquefied petroleum gas, coal gas besides the traditional oxygen-ethyne combination have been used for cutting. Recently, some new cutting processes, such as gas plasma cutting and cutting with H-O obtained from electrolyzed water have been developed. However, the above mentioned cutting equipment needs a large investment and their technologies are complicated. For resolving such problems, the same inventor of this application has invented a gasoline-oxygen cutting machine which has been granted Chinese Utility Model Patent No. 90218437. This kind of gasoline-oxygen cutting machine comprises a gas pump, a pressurized container, a gasoline tank, a fuel gas producing tube and a pressure-stabilizing tube. Said fuel gas producing tube is made of a 8 mm~20 mm diameter thin walled copper tube or ferrous tube having a plurality of small bores on the wall of the tube. After bending it is sealed at its top. The drawbacks of the gasoline-oxygen cutting machine is that the gasoline cannot be fully used up, and the equipment needs to be provided with additional power source. Moreover, the oxidization of the flame is high and the flame contains nitrogen gas.

OBJECT OF THE INVENTION

The object of the invention is to overcome the drawbacks of the gasoline-oxygen cutting machine used in the prior art, and to provide a cutting torch specially adapted to a gasoline-oxygen cutting machine, which can make the gasoline atomize perfectly and burn immediately. Moreover, the gasoline in the gasoline tank can be basically used up.

Another object of the invention is to provide a cutting torch specially adapted to gasoline-oxygen cutting machine without an additional power source.

A further object of the invention is to provide a cutting torch specially adapted to the gasoline-oxygen cutting machine, which generates flames with flow oxidization, and low or no nitrogen content.

SUMMARY OF THE INVENTION

In order to achieve these objects, the invention provides a cutting torch specially adapted to an gasoline-oxygen cutting machine comprising a cutting torch body; a gasoline tube, a preheating oxygen tube and a cutting oxygen tube; a gasoline adjusting valve, a preheating oxygen adjusting valve and a cutting oxygen adjusting valve fitted on the cutting torch body; and a cutting head; said gasoline tube, said preheating oxygen tube and said cutting oxygen tube communicating with a main oxygen tube and a main gasoline tube respectively through the gasoline adjusting valve, the preheating oxygen adjusting valve and the cutting oxygen adjusting valve, and further communicated with an oxygen bottle and a gasoline tank through the main oxygen tube and the main gasoline tube, the other end of said gasoline tube, the preheating oxygen tube and the cutting oxygen tube communication with the cutting head, wherein said cutting head comprises a cutting oxygen passage, at least one preheating oxygen passage, at least one gasoline passage and a combustion cover, said cutting oxygen passage being located at the center of the cutting head, said gasoline passage (s) being located at the outside of said cutting oxygen passage, and said preheating oxygen passage being located at the outmost side, said combustion cover being screwed on one end of the cutting head, and the other end of the cutting head being connected with the cutting head.

Preferably, said cutting head has one to two 0.4 to 0.8 mm diameter gasoline passage(s), and five to eight 0.2 to 0.4 mm diameter preheating oxygen passages, three of which being adjacent to the gasoline passage(s), the others being provided circumferentially.

Preferably, the number of said gasoline passage of the cutting head is one and its diameter is 0.5 mm; and the number of said preheating passages is six and their diameters are 0.3 mm.

Preferably, the gasoline tube connected with said cutting head is provided with a fine tube, the other end of said fine tube being connected with the cutting torch body, and said gasoline adjusting valve being provided with a fine-thread having a screw pitch of less than 0.5 mm.

Preferably, said fine tube passes through two fixing rings, said fixing rings being fitted in the gasoline tube with a slight force fitting, and said fine tube having a diameter of 0.8~1.0 mm.

Preferably, said fine tube is formed by a channel formed on a solid bar, the cross section of said channel being 0.5~0.8 mm², said solid bar being fitted in the gasoline tube tightly.

Preferably, said fine tube is formed by a space between a stop bar and the gasoline tube, said stop bar having fine shaped portions at both ends and a thick portion in the middle, and having 0.8 to 1.0 mm diameter passages along the center of the two fine shaped portions longitudinally, the middle thick portion being provided with 0.8 to 1.0 mm diameter radial passages at two proper portions, one end of said radial passages communicating with one of the longitudinal passages at the fine sections, and the other end communicating with a spacing between the stop bar and the gasoline tube, said spacing being of 0.05~0.08 mm width, each end of the thick portion of said stop bar having a flange which is fitted tightly in the gasoline tube.

According to the invention, there is further provided a gasoline-oxygen cutting machine provided with said special cutting torch, which comprises an oxygen bottle, a pressurizable gasoline tank, a main gasoline tube and a main oxygen tube, and a special cutting torch, said special cutting torch comprising a cutting torch body; a gasoline tube, a preheating oxygen tube, and a cutting oxygen tube; a gasoline adjusting valve, a preheating oxygen adjusting valve and a cutting oxygen adjusting valve mounted on the cutting torch body; and a cutting head, said gasoline tube, said preheating oxygen tube and said cutting oxygen tube communicating with the main oxygen tube and the main gasoline tube through the gasoline adjustng valve, the preheating oxygen adjusting valve and the cutting oxygen adjusting valve respectively, and communicating with an oxygen bottle and an gasoline tank through the main oxygen tube and the main gasoline tube respectively, the other ends of said gasoline tube, the preheating oxygen tube and the cutting oxygen tube communicating with the cutting head, wherein said cutting head comprises a cutting oxygen passage, at least one preheating oxygen passage, at least one gasoline passage and a combustion cover, said cutting oxygen passage being located at the center of the cutting head, said gasoline passage being located at the outside of the cutting oxygen passage, said preheating oxygen passage being located at the outermost side, said combustion cover being screwed on one end of the cutting head, and the other end of cutting head being connected with the cutting torch body.

The cutting torch specially adapted to gasoline-oxygen cutting machine according to the invention can make the gasoline atomized perfectly. After ignition with oxygen it can cut about 60 mm thickness steel plate. This kind of cutting machine can be microminiaturized and can be made into a portable tool which has a low cost and can be used in a variety of conditions.

BRIEF DESCRIPTION OF THE DRAWINGS

The invention will be described in more detail with reference to the embodiments shown in the accompanying drawings, wherein.

DETAILED DESCRIPTION OF THE PREFERRED EMBODIMENTS

Figure 1:
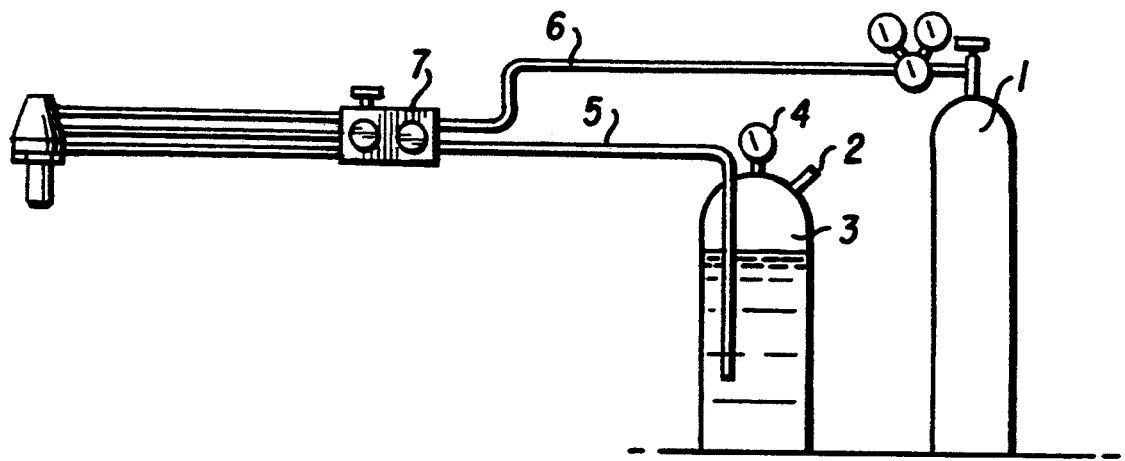
FIG. 1 is a schematic drawing showing a cutting machine provided with a torch according to the invention.

Referring to FIG. 1, the gasoline-oxygen cutting machine provided with the torch of the invention comprises an oxygen bottle 1 and a gasoline tank 3. A manual inflator tip 2 for gasoline tank is used to pressurize the gasoline tank 3. A pressure meter 4 is attached to the top of the gasoline tank 3. The oxygen bottle 1 and the gasoline tank 3 communicate with isobaric cutting torch 7 through a main oxygen tube 6 and a main gasoline tube 5 respectively.

Figure 2:
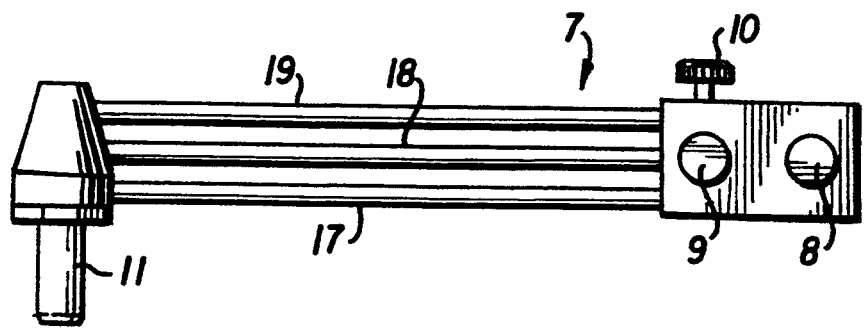
FIG. 2 shows an isobaric torch according to the invention.
Figure 7:
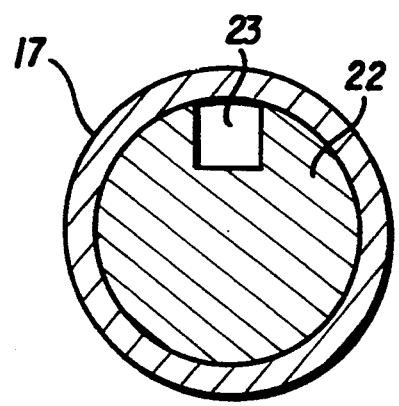
FIG. 7 is a cross sectional view of the gasoline tube taken along line 7—7 of FIG. 6.

FIG. 2 is a detailed drawing of the special cutting torch of the invention, wherein said special cutting torch includes a cutting torch body 7, a gasoline tube 17, a preheating oxygen tube 18, a cutting oxygen tube 19, a gasoline adjusting valve 8, a preheating oxygen adjusting valve 9 and a cutting oxygen adjusting valve 10 mounted on the cutting torch body 7, and a cutting head 11. Said gasoline tube 17, said preheating oxygen tube 18 and said cutting oxygen tube 19 communicate with the main gasoline tube 5 and the main oxygen tube 6 through the gasoline adjusting valve 8, the preheating oxygen adjusting valve 9 and the cutting oxygen adjusting valve 10, respectively.

A cutting head 11 mounted to the special cutting torch of the invention is shown in FIG. 2. Said curing head 11 includes a cutting oxygen tube 16, at least one preheating oxygen passage 12, at least one gasoline passage 13 and a combustion cover 15. Said cutting oxygen passage 16 is located at the center of the cutting head 11, said gasoline passage(s) 13 is(are) located at the outside of said cutting oxygen passage 16, and said preheating oxygen passage(s) 12 is(are) located at the outermost side. Said combustion cover 15 is screwed on one end of the cutting head 11, the other end of which is connected with the cutting torch body 7.

Figure 3:
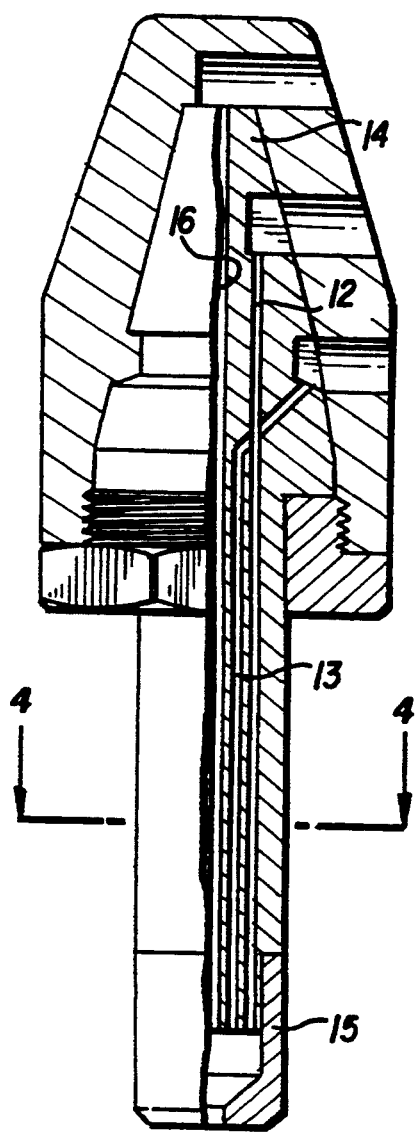
FIG. 3 shows a cutting head mounted to the isobaric torch according to the invention.
Figure 4:
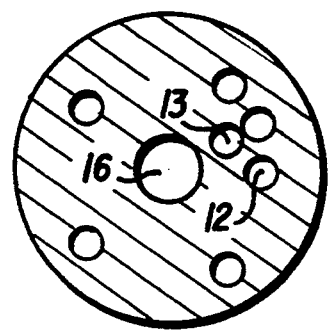
FIG. 4 is a cross sectional view taken along line 4—4 of FIG. 3.

In one embodiment of the invention, the cutting head 11 has only one 0.5 mm diameter gasoline passage 13, and six 0.3 mm diameter preheating oxygen passages 12 wherein three preheating oxygen passages 12 are adjacent to the gasoline passage 13, and the other three preheating oxygen passages are provided circumferentially outside of the former three preheating oxygen passages. (see FIGS. 3 and 4).

The working precedure of the special cutting torch of the invention is as follows: first, the valve of the oxygen bottle is opened, and the pressure of oxygen is adjusted to 0.1~0.6 MPa. Oxygen enters the cutting torch 7 through the oxygen tube 6. After the gasoline tank 3 is filled with a certain amount of gasoline, the gasoline tank 3 is pressurized by the inflator through the manual inflator tip 2. The pressure in the tank 3 can be shown by the pressure meter 4 and may be controlled to between 0.1 and 0.4 MPa. Gasoline enters the cutting torch 7 along the gasoline tube 5. The preheating oxygen valve 9 and the gasoline adjusting valve 8 are then opened, so that gasoline enters the gasoline passage(s) 13 of the cutting head 11, and preheating oxygen enters the preheating oxygen passage 18. The openings of said two valves are adjusted to make gasoline and oxygen atomized and mixed perfectly in space at the end of the the cutting head 11, and then ejected from the tip of the combustion cover 15. After ignition, the igniting mixed gas preheats the steel plate. When the temperature of the steel plate reachs its melting point, the cutting oxygen adjusting valve 10 is opened, so that the cutting oxygen reachs the steel plate along cutting oxygen passage 19 and, the steel plate is cut immediately.

Figure 9:
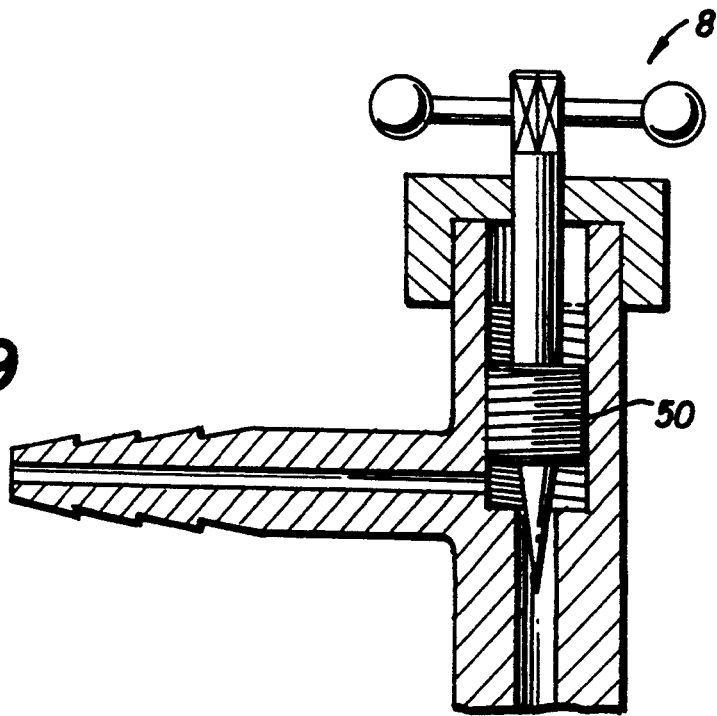
FIG. 9 is a schematic view of the gasoline adjusting valve.
Figure 5:
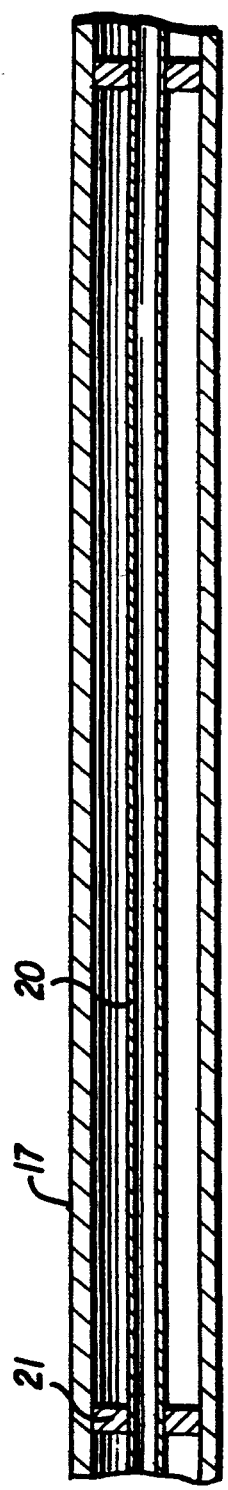
FIG. 5 is a first embodiment of the gasoline tube mounted in the isobaric torch according to the invention.
Figure 6:
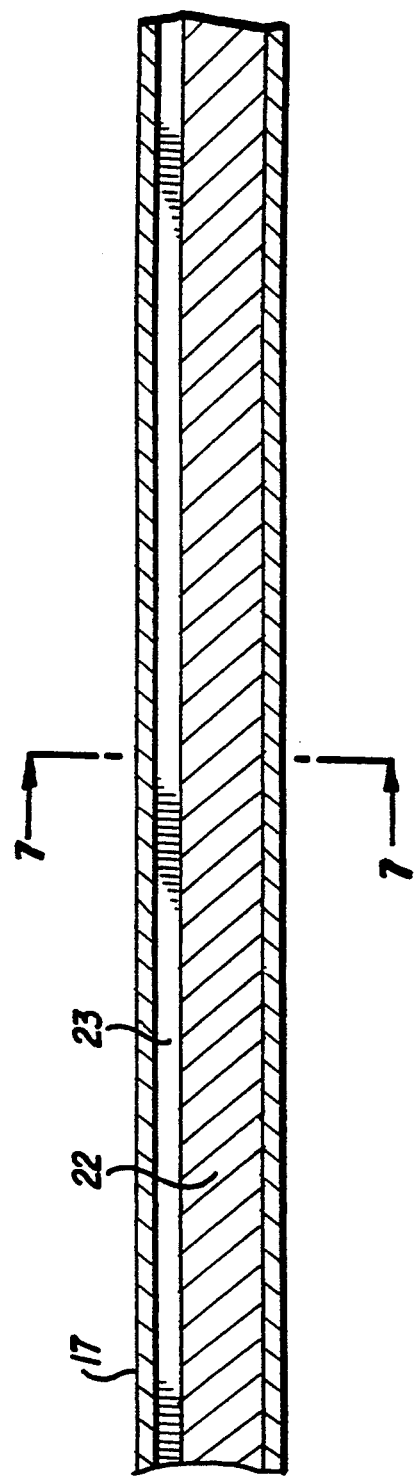
FIG. 6 is a second embodiment of the gasoline tube mounted in the isobaric torch according to the invention.
Figure 8:
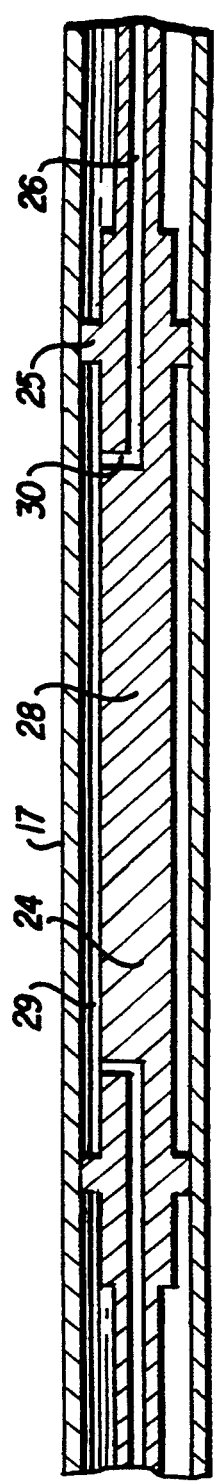
FIG. 8 is a third embodiment of the gasoline tube mounted in the isobaric torch according to the invention.

FIG. 5 is a first embodiment of the gasoline tube mounted in the isobaric cutting torch of the invention. The gasoline tube 17 has at its center a fine tube 20, which has a diameter of 0.8~1.0 mm. In one embodiment, said fine tube 20 has a diameter of 0.9 mm. The fine tube 20 is fixed in the gasoline tube by two fixing rings 21, and the two ends of the fine tube 20 communicate with the cutting torch body 7 and the gasoline tube 17 of the cutting head 11 respectively. FIG. 6 is a second embodiment of the gasoline tube mounted in the isobaric cutting torch of the invention. In the gasoline tube 3 there is inserted a solid metal bar 22 which has a channel 23 along its longitudinal surface (see FIG. 6,7). The channel 23 has a cross section of 0.5~0.8 mm². In a preferred embodiment, said cross section of the channel 23 of the metal bar is 0.7 mm². The solid metal bar 22 is fitted in the gasoline tube 17 tightly, and the two ends of the bar 22 are connected with the cutting torch body 7 and the cutting head 11 respectively. Gasoline flows towards the cutting head 11 from the cutting torch body 7 only through the channel 23 of the metal bar 22 (or the fine tube 20), so that the pressure head loss in the gasoline tube is identical everywhere. FIG. 8 is a third embodiment of the gasoline tube mounted in the isobaric cutting torch of the invention. In this embodiment, a stop bar 24 is provided in the gasoline tube 17. Each end of said stop bar 24 has an annular flange 25, respectively. The stop bar 24 has fine shaped portions at both ends, and a thick portion in the middle, and has 0.8 to 1.0 mm diameter small longitudinal passage 26 along the center of the two fine shaped portions longitudinally, like the fine tube 20 in the gasoline tube 17 of the above embodiment. In a preferred embodiment, the diameter of said small passage 26 is 0.9 mm. At two proper positions of the middle thick section 28 of the stop bar 24, there are provided two 0.8 to 1.0 mm diameter small radial passages 30. In one preferred embodiment, the diameter of said small passages 30 is 0.9 mm. One end of each of said small passages 30 communicate with one of the small longitudinal passages 26 at the fine sections, and the other end communicate with a spacing 29 between the stop bar 24 and the gasoline tube 17. The spacing between them is of 0.05~0.08 mm width, and is 0.05 mm in this embodiment. The flanges 25 are fitted in the gasoline tube 17 tightly, and the two ends of the stop bar 24 are connected with the cutting torch body 7 and the cutting head 11 respectively. Therefore, when gasoline flows towards the cutting head 11 from the cutting torch body 7, gasoline firstly flows into the space between the stop bar 24 and the gasoline tube 17 from one of the longitudinal passages 26 and then through one of the small radial passages 30, then flows towards the cutting head 11 from the space 29 through another small radial passages 30 and another longitudinal passage 26. Therefore, the pressure head loss in the gasoline tube is identical everywhere. As shown in FIG. 9, gasoline adjusting valve 8 is provided with a fine thread 50 having a screw pitch of less than 0.5 mm.

I claim:

1. A cutting torch for a gasoline-oxygen cutting machine comprising a cutting torch body (7); a gasoline tube (17), a preheating oxygen tube (18) and a cutting oxygen tube (19); a gasoline adjusting valve (8), a preheating oxygen adjusting valve (9) and a cutting oxygen adjusting valve (10) fitted to the cutting torch body (7); and a cutting head (11); said gasoline tube (17), said preheating oxygen tube (18) and said cutting oxygen tube (19) communicating with a main oxygen tube (6) and a main gasoline tube (5), respectively, through the gasoline adjusting valve (8), the preheating oxygen adjusting valve (9) and the cutting oxygen adjusting valve (10), respectively, and further communicating with an oxygen bottle (1) and a gasoline tank (3) through the main oxygen tube (6) and the main gasoline tube (5), respectively, the other ends of said gasoline tube (17), said preheating oxygen tube (18) and said cutting oxygen tube (19) communicating with the cutting head (11), wherein said cutting head (11) comprises a cutting oxygen passage (16), at least one preheating oxygen passage (12), at least one gasoline passage (13) and a combustion cover (15), said cutting oxygen passage (16) being located at the center of the cutting head (11), said gasoline passage (13) being located at the outside of said cutting oxygen passage (16), and said preheating oxygen passage (12) being located at the outermost side, said combustion cover (15) being screwed on one end of the cutting head (11), and the other end of the cutting head (11) being connected with the cutting torch body (7), said gasoline passage and said preheating oxygen passages having cross-sectional dimensions sufficiently small so as to induce atomization of gasoline flowing through said torch head.

2. A cutting torch according to claim 1, wherein said cutting head (11) has one to two 0.4 to 0.8 mm diameter gasoline passage(s) (13), and five to eight 0.2 to 0.4 mm diameter preheating oxygen passages (16), three of which being adjacent to the gasoline passage(s) (13), the others being provided circumferentially.

3. A cutting torch according to claim 1, wherein the number of said gasoline passages (13) of the cutting head (11) is one, and its diameter is 0.5 mm; the number of said preheating oxygen passages (16) is six and their diameters are 0.3 mm.

4. A cutting torch according to claim 1, wherein the gasoline tube (17) connected with said cutting head (11) is provided with a fine tube (20), the other end of said fine tube (20) being connected with the cutting torch body (7), said gasoline adjusting valve (8) being provided with a fine thread having a screw pitch of less than 0.5 mm.

5. A cutting torch according to claim 4, wherein said fine tube (20) passes through two fixing rings (21), said fixing rings (21) being fitted in the gasoline tube (17) with a slight force fitting, said fine tube having a diameter of 0.8–1.0 mm.

6. A cutting torch according to claim 4, wherein said fine tube (20) is formed by a channel (23) formed on a solid bar (22), the cross section of said channel (23) being 0.5–0.8 mm$^2$, and said solid bar (22) being fitted in the gasoline tube (17) tightly.

7. A cutting torch according to claim 4, wherein said fine tube (20) is formed by a space between a stop bar (24) and the gasoline tube (17), said stop bar (24) having fine shaped portions at both ends and a thick portion in the middle, and having 0.8 to 1.0 mm diameter passages (26) along the center of the two fine shaped portions longitudinally, the middle thick portion being provided with 0.8 to 1.0 mm diameter radial passages at two proper positions, one end of said small radial passages being communicated with one of the longitudinal passages (26) at the fine sections, and the other end being communicated with a spacing between the stop bar (24) and the gasoline tube (17), said spacing being of 0.05–0.08 mm width, each end of the thick portion of said stop bar (24) having a flange which is fitted tightly in the gasoline tube (17).

8. A gasoline-oxygen cutting machine having a cutting torch, comprising an oxygen bottle (1), a pressurizable gasoline tank (3), a main gasoline tube (5) and a main oxygen tube (6), and a cutting torch (7), said cutting torch comprising a cutting torch body (7); a gasoline tube (17), a preheating oxygen tube (18), and a cutting oxygen tube (19); a gasoline adjusting valve (8), a preheating oxygen adjusting valve (9) and a cutting oxygen adjusting valve (10) mounted on the cutting torch body (7); and a cutting head (11), said gasoline tube (17), said preheating oxygen tube (18) and said cutting oxygen tube (19) communicating with the main oxygen tube (6) and the main gasoline tube (5) through the gasoline adjusting valve (8), the preheating oxygen adjusting valve (9) and the cutting oxygen adjusting valve (16), respectively, and communicating with an oxygen bottle (1) and a gasoline tank (3) through the main oxygen tube (6) and the main gasoline tube (5), respectively, the other ends of said gasoline tube (17), the preheating oxygen tube (18) and the cutting oxygen tube (19) communicating with the cutting head (11), wherein said cutting head (11) comprises a cutting oxygen passage (16), at least one preheating oxygen passage (12), as least one gasoline passage (13) and a combustion cover (15), said cutting oxygen passage (16) being located at the center of the cutting head (11), said gasoline passage (13) being located at the outside of the cutting oxygen passage (16), said preheating oxygen passage (15) being located at the outermost side, said combustion cover (12) being screwed on one end of the cutting head (11), and the other end of the cutting head (11) being connected with the cutting torch body (7), said gasoline passage and said preheating oxygen passages having cross-sectional dimensions sufficiently small so as to induce atomization of gasoline flowing through said torch head.

9. A gasoline-oxygen cutting machine having oxygen supplied thereto by a main oxygen tube (6) and gasoline supplied thereto by a main gasoline tube (5), comprising:
   a cutting torch (7) including:
      a torch body for receiving the gasoline and the oxygen respectively delivered by said main gasoline tube (5) and said main oxygen tube (6);
      a cutting head (11),
      a gasoline tube (17) for delivering the gasoline from said body to said head (11);
      a preheating oxygen tube (18) for delivering a portion of the oxygen from said body to said head (11);
      a cutting oxygen tube (19) for delivering the other portion of the oxygen from said body to said head (11);
      a gasoline adjusting valve (8) mounted on said body for adjusting the rate of the gasoline through said gasoline tube (17);
      a preheating oxygen adjusting valve (9) mounted on said body for adjusting the rate of the preheating oxygen through said preheating oxygen tube (18); and
      a cutting oxygen adjusting valve (10) mounted on said body for adjusting the rate of the cutting oxygen through said cutting oxygen tube (19); and wherein said cutting head (11) comprises:
      a cutting oxygen passage (16), connected to said oxygen tube (19) and located at the center of said head (11), for jetting the cutting oxygen;
      at least one gasoline passage (13) of 0.4–0.8 mm diameter, connected to said gasoline tube (17) and located at the outside of said cutting oxygen passage (16), for jetting the gasoline;
      at least five preheating oxygen passages (12) of 0.2–0.4 mm diameter, connected to said preheating oxygen tube (18) and located at the outside of said gasoline passage (13), for jetting the preheating oxygen; three of them being adjacent to said gasoline passages (13), the others being provided circumferencially; and
      a combustion cover (15) mounted on the tip of said head (11).

10. The cutting machine according to claim 9, wherein said cutting head (11) has one said gasoline passage (13) with the diameter of 0.5 mm, and has six said preheating oxygen passages (16) with the diameter of 0.3 mm.

11. The cutting machine according to claim 9, wherein said gasoline tube (17) contains a fine tube (20) for delivering the gasoline from said torch body to said cutting head (11), and said gasoline adjusting valve (8) has a fine thread with a screw pitch of less than 0.5 mm.

12. The cutting machine according to claim 11, wherein said fine tube (20) has a diameter of 0.8–1.0 mm and is mounted within said gasoline tube (17) by two fixing rings (21) fitted in said gasoline tube (17).

13. The cutting machine according to claim 11, wherein said fine tube (20) is formed by a channel (23) formed on a solid bar (22) tightly fitted in said gasoline tube (17), the cross section of said channel (23) being 0.5–0.8 mm$^2$.

14. The cutting machine according to claim 11, wherein said fine tube (20) is formed by a space between said gasoline tube (18) and a stop bar (24) mounted in said gasoline tube (17), said stop bar (24) having fine shaped portions at its both ends and thick portion in its middle, and having 0.8–1.0 mm diameter passages (26) longitudinally along the center of said fine shaped portions, said middle thick portion being provided with 0.8–1.0 mm diameter radial passage for communicating said longitudinal passages (26) with said space, said space being of 0.05–0.08 mm width, each end of said middle thick portion having a flange for being fitted tightly in said gasoline tube (17).

15. A gasoline-oxygen cutting machine, comprising an oxygen bottle (1), a pressurizable gasoline tank (3), a main gasoline tube (5) and a main oxygen tube (6), and a cutting torch (7), said cutting torch comprising a cutting torch body (7); a gasoline tube (17), a preheating oxygen tube (18), and a cutting oxygen tube (19); a gasoline adjusting valve (8), a preheating oxygen adjusting valve (9) and a cutting oxygen adjusting valve (10) mounted on the cutting torch body (7); and a cutting head (11), said gasoline tube (17), said preheating oxygen tube (18) and said cutting oxygen tube (19) communicating with the main oxygen tube (6) and the main gasoline tube (5) through the gasoline adjusting valve (8), the preheating oxygen adjusting valve (9) and the cutting oxygen adjusting valve (16), respectively, and communicating with an oxygen bottle (1) and a gasoline tank (3) through the main oxygen tube (6) and the main gasoline tube (5), respectively, the other ends of said gasoline tube (17), the preheating oxygen tube (18) and the cutting oxygen tube (19) communicating with the cutting head (11), wherein said cutting head (11) comprises a cutting oxygen passage (16), at least one preheating oxygen passage (12), at least one gasoline passage (13) and a combustion cover (15), said cutting oxygen passage (16) being located at the center of the cutting head (11), said gasoline passage (13) being located at the outside of the cutting oxygen passage (16), said preheating oxygen passage (12) being located at the outermost side, said combustion cover (15) being screwed on one end of the cutting head (11), and the other end of the cutting head (11) being connected with the cutting torch body (7), and said cutting head (11) having at least one 0.4 to 0.8 mm diameter gasoline passage (13), and at least five 0.2 to 0.4 mm diameter preheating oxygen passages (12), three of which being adjacent to the gasoline passage (13), the other being provided circumferentially.

* * * * *